United States Patent Office 3,422,327
Patented Jan. 14, 1969

3,422,327
MULTIPLE CHANNEL FAIL FUNCTIONAL SYSTEM FOR DISCRETELY DISCONNECTING MALFUNCTIONING SUB-SYSTEMS
John S. McBrayer, Phoenix, Paul E. Pearson, Jr., Scottsdale, and Robert W. Robinson, Phoenix, Ariz., assignors to Sperry Rand Corporation, a corporation of Delaware
Filed Sept. 17, 1965, Ser. No. 488,110
U.S. Cl. 318—18                    7 Claims
Int. Cl. G05b 7/68; H02p 7/74

ABSTRACT OF THE DISCLOSURE

A multiple channel fail functional system which provides fail functional operation of the system by monitoring each of the sub-systems in such a way that in the event of malfunction, only the affected sub-system is disconnected and the other variable gain elements of the system have their gains modified in order that the system continues to operate in essentially its normal manner.

The invention herein described was made in the course of or under a contract or subcontract thereunder, with the Department of the Army.

The present invention relates to monitoring apparatus for control systems for maneuverable craft. The monitoring apparatus of the present invention detects malfunctions in the control system and monitors the system to prevent structural failure of the craft as well as discomfort to the personnel therein. The improved monitoring apparatus of the present invention is particularly suitable for monitoring the functions of an aircraft automatic flight control system.

Prior art types of monitoring apparatus of this general nature generally required additional sensing elements for measuring the actual motion of the craft about each monitored axis. For example, the system disclosed in U.S. Patent No. 2,487,793 entitled, "Object Controlling Electric Motor System," issued Nov. 15, 1949 to Esval et al. requires the inclusion of an additional pair of accelerometers for each monitored axis. Furthermore, it is usual in prior art monitoring devices for an entire control channel to be disconnected when a component thereof malfunctions thereby rendering it useless for stabilizing the craft although the malfunction occurred in only one component or portion of the channel.

In contrast, the present invention includes means for isolating faults in the components and automatically monitoring the components which are most likely to fail. Then, by utilizing a dual redundant system for each axis of the craft, when a failure occurs in a component associated with a channel that component is selectively rendered ineffective while the axis gain is adjusted to maintain system performance in spite of the malfunction. By means of the dual redundant channels, each axis is arranged so that when one portion or component of one channel is rendered ineffective, the remaining portion or components of that axis continue to be disposed in a redundant configuration.

It is a primary object of the present invention to provide monitoring apparatus for control systems without the necessity of adding additional sensing apparatus.

It is another object of the present invention to provide monitoring apparatus for control systems which is continuously operative to provide monitoring and selectively renders only the malfunctioning portion of the system ineffective.

It is a further object of the present invention to provide monitoring apparatus for dual redundant control systems in which only the malfunctioning portion is rendered ineffective while the remaining portions continue to be effective and redundant.

Figure 1:
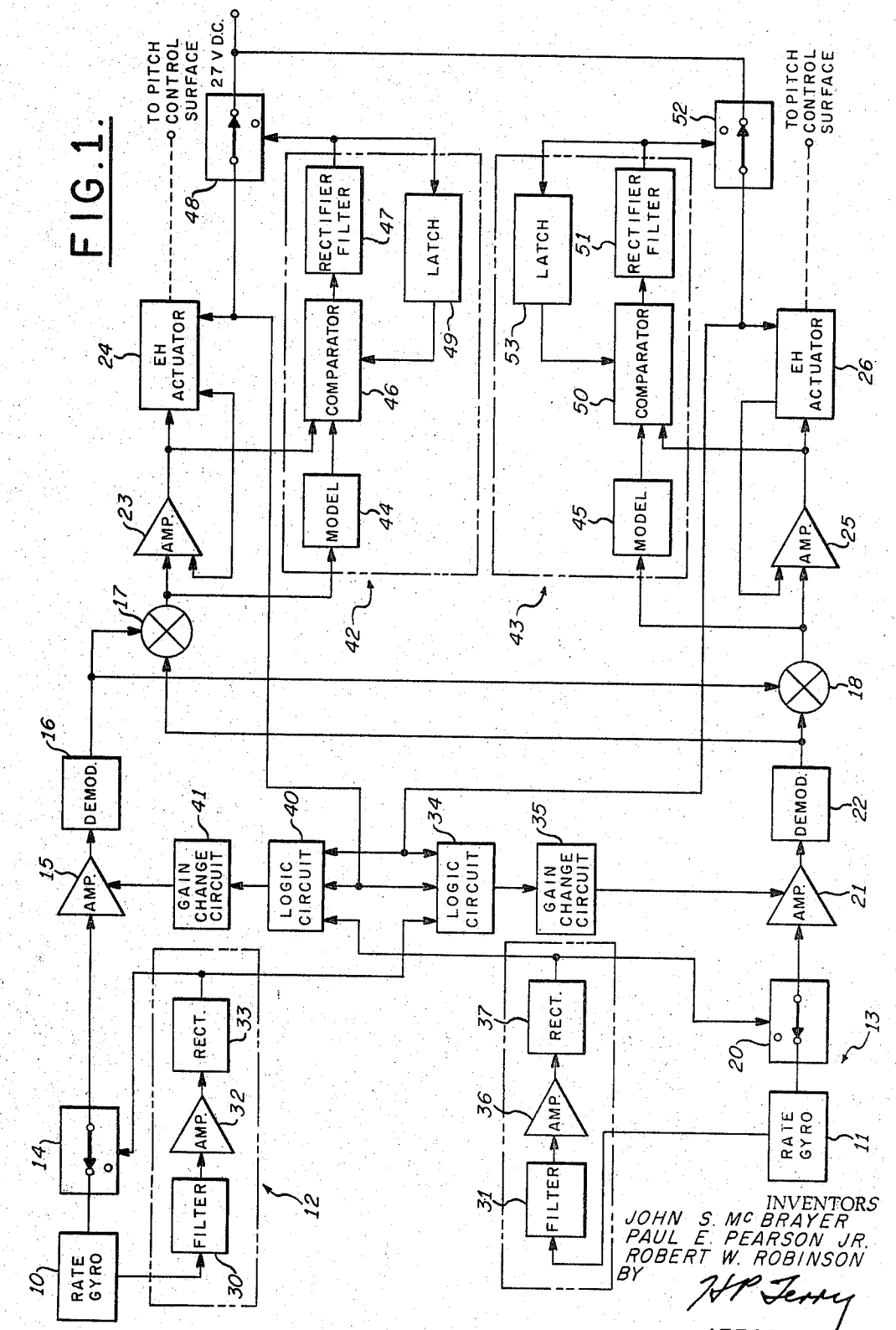
Figure 2:
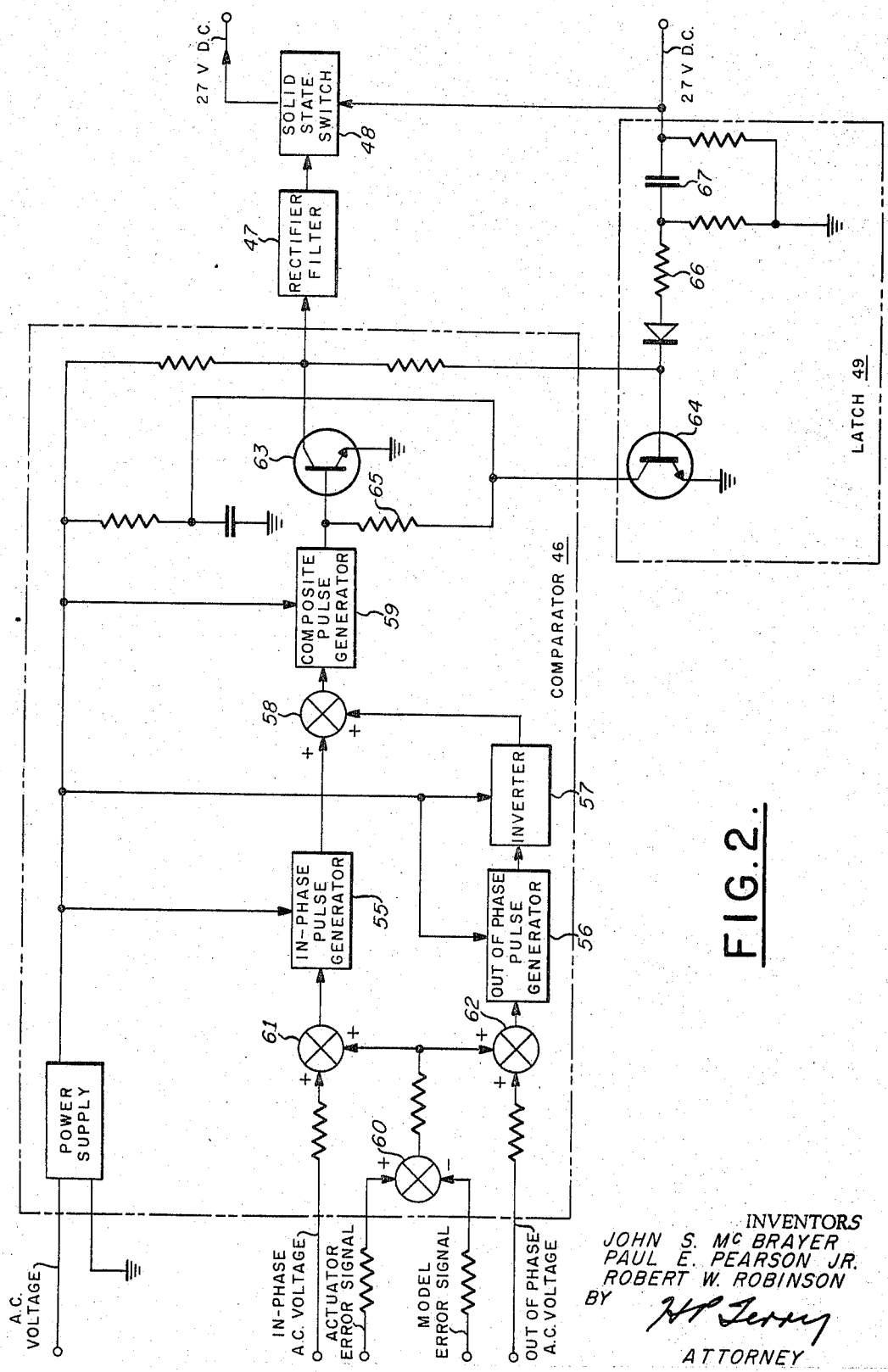

These and other objects will become apparent from the following description when read in conjunction with the drawings in which:

FIG. 1 is a schematic illustration of a flight control system with respect to one axis incorporating the monitoring system of the present invention; and FIG. 2 is a detailed schematic wiring diagram of the comparator and latching circuits of FIG. 1.

The monitoring system of the present invention is generally applicable to control systems but will be described with respect to a stability augmentation control system with regard to one axis of an aircraft for purposes of example.

The motion of the aircraft with respect to the axis concerned is sensed by the rate gyros 10 and 11 of dual redundant channels 12 and 13. The channels 12 and 13 may be pitch channels for example, in which case, the rate gyros would be responsive to the rate of pitch of the aircraft and provide an A.C. output proportional to the pitch rate. Normally, the output of the rate gyro 10 is connected through a solid state switch 14 to an amplifier 15. The amplified output of the amplifier 15 is demodulated in a demodulator 16 and connected to the input of algebraic summation circuits 17 and 18. Similarly, the output of the rate gyro 11 is normally connected through a solid state switch 20, amplifier 21 and demodulator 22 and thence to the input terminals of the algebraic summation circuits 17 and 18. The output of the algebraic summation circuit 17 is amplified in an amplifier 23 for controlling an electro-hydraulic actuator 24 which is connected to drive the pitch control surfaces as indicated by the legend. Similarly, the output of the summing circuit 18 is amplified in an amplifier 25 to control an electro-hydraulic actuator 26 which is also connected to drive the pitch control surfaces as indicated by the legend. Conventional position feedback from the actuators 24 and 26 to the respective amplifiers 23 and 25 may be utilized for stabilization purposes.

The electro-hydraulic actuators 24 and 26 generally are extensible linkage self-contained electro-hydraulic position servomechanisms and the amplifiers 15 and 21 have their gain adjustments normally arranged such that the sum of the signals from the rate gyros 10 and 11 actuate both actuators 24 and 26. In the event either one of the rate gyros 10 and 11 or the actuators 24 and 26 malfunction, it is then necessary to double the gain of the amplifier 15 or 21 of the correctly operating channel. This is accomplished as follows. The rate gyros 10 and 11 each provide a second output which has a frequency proportional to the gyro rotor speed. This signal may be obtained as described in detail in U.S. Patent No. 3,186,211 entitled "Self-Checking Gyroscopic Apparatus" issued June 1, 1965 of Reed et al. by slotting the gyro rotor and passing a constant D.C. current through the self-test torquing coils (not shown). Current is fed through the two coils in opposite directions to insure that no steady state torque of the gyro output gimbal (not shown) exists. As the slot in the rotor passes the coil, a pulse of current is produced. During normal operation this output of the gyros 10 and 11 is a 1600 pulse per second signal which is connected to respective 1600 cycle per second bandpass filters 30 and 31. The output of the filter circuit 30 is connected to an amplifier 32 and thence to a rectifier 33. The output of the rectifier 33 is an amplified and rectified voltage, for example 28 volts D.C. which is connected to the solid state switch 14 and to a logic circuit 34. The logic circuit 34 may be an AND circuit for example, in a manner to be more fully explained. The 28 volt D.C. signal from the rectifier 33 maintains the switch 14 in its "on" condition thereby connecting the rate gyro 10 to the amplifier 15 under normal conditions. Should the gyro rotor speed vary by more than a predetermined amount from its desired speed, the gyro output frequency signal will change resulting in a reduced output signal from the filter circuit 30. This results in a reduced output from the amplifier 32 and rectifier 33 causing the switch 14 to switch to its off position, thereby disconnecting the rate gyro 10 from the amplifier 15 and rendering the gyro 10 ineffective. With only the rate gyro 11 now operating normally, the amplifier 21 must now have its gain or amplification doubled in order to control the actuators 24 and 26 correctly. This is accomplished by means of the absence of the signal from the rectifier 33 causing an output from the logic circuit 34 to a gain change circuit 35 which causes the amplifier 21 to double its gain. It will be noted that although the rate gyro 10 is now rendered ineffective, the electro-hydraulic actuators 24 and 26 and their associated circuitry still remain in a redundant configuration thereby continuing to provide an additional safety factor.

In a similar manner, the rate gyro 11 provides a gyro rotor speed signal through the filter 31, amplifier 36, and a rectifier 37 to the switch 20. The rectifier 37 also is connected to a logic circuit 40 which in turn is connected to gain change circuit 41 to the amplifier 15. The electro-hydraulic actuators 24 and 26 and their associated circuitry are monitored by respective failure monitors 42 and 43 whose function is to simulate electronically the closed loop characteristic of the respective electro-hydraulic actuators 24 and 26, and for this purpose each of the monitors 42 and 43 includes a respective model 44 and 45 which electronically simulates the respective characteristics and provides an output signal accordingly. The difference in the performance between the model 44 and the electro-hydraulic actuator 24 is compared in a comparison circuit 46. During normal operation when the two input signals are within a predetermined value, the comparison circuit 46 provides an output which is rectified and filtered in a rectifier filter circuit 47 and maintains a solid state switch 48 in a "closed" or "on" position, thereby connecting a constant voltage power supply, for example 27 volts D.C., to the electro-hydraulic actuator 24. The 27 volt D.C. signal is also connected to another input terminal of each of the logic circuits 34 and 40. If the input signals to the comparison circuit 46 exceeds a predetermined difference which indicates a malfunction, there is no output from the comparison circuit 46 and thus no output from the rectifier filter 47 which "opens" or turns "off" the switch 48 thereby disconnecting the 27 volt D.C. signal from both the electro-hydraulic actuator 24 and the logic circuits 34 and 40. This renders the electro-hydraulic actuator 24 ineffective and the output signal from the logic circuits 34 and 40 causes the gain changing circuits 35 and 41 to double the gain on the amplifiers 21 and 15, respectively, thereby causing the remaining electro-hydraulic actuator 26 to control the surfaces correctly. A latching circuit 49 provides a feedback signal from the output of the rectifier 47 to the comparison circuit 46 to maintain the switch 48 in an "open" or "off" configuration after a malfunction. A second function of the latching circuit 49 is to turn the switch 48 on or to its closed position when 27 volts is applied to the actuator 24 and to the monitor 42 as well as to provide an initial one second time delay to allow time for the actuator 24 and monitor 42 to settle out after initial transients. The structure and operation of the comparison and latching circuits 46 and 49 will be explained in greater detail with respect to FIG. 2.

In a similar manner the output of the model 45 of the monitor 43 is connected to a comparison circuit 50 which in turn is connected to a rectifier filter circuit 51 and thence to a solid state switch 52 and switch 52 is disposed between the power supply and the electro-hydraulic actuator 26. The output of the rectifier 51 also is connected through a latching circuit 53 to the comparison circuit 50.

The monitor 43 acts in a similar manner as explained above with respect to the monitor 42.

A detailed explanation of the structure and operation of a suitable comparison circuit 46 and latching circuit 49 will now be described by referring to FIG. 2. The pulse train of the comparison circuit 46 comprises the sum of two pulses trains. An in-phase pulse train is generated by the application of an in-phase A.C. voltage indicated by the legend to an in-phase generator 55 which may consist of a tunnel diode and a transistor (not shown). An out-of-phase pulse train is generated by the application of an out-of-phase A.C. voltage indicated by the legend to an out-of-phase generator 56. The characteristic of each tunnel diode (not shown) is such, for example, that the voltage across it switches abruptly from 0.1 volt to 0.7 volt as the current reaches approximately +0.1 ma. This characteristic is utilized by connecting each tunnel diode across the base-emitter of a transistor (not shown) and thus switching the transistor on and off with a repetition rate corresponding to the excitation voltage. The out-of-phase pulse train is connected through a phase inverter 57 and the resultant therefrom is summed in algebraic summation device 58 with the in-phase pulse train from the generator 5. The summation of these pulse trains is required to generate the composite pulse train in composite pulse train generator 59. The composite pulse train is generated in a manner similar to the generation of both the in-phase and out-of-phase pulse trains.

As explained previously, the function of the comparison circuit 46 is to compare the difference between the error voltages associated with the electro-hydraulic actuator 24 and those of the electronic model 44 which are of opposite polarity with respect to each other. The error voltage from the amplifier 23 is indicated as the actuator error signal while the error voltage from the model 44 is indicated as the model error signal. The error signals are summed with each other in algebraic summation device 60 while the resultant thereof is summed with both the in-phase and out-of-phase A.C. voltages in algebraic summation devices 61 and 62, respectively. Should the difference between the error signals result in a positive output, this resultant subtracts from the out-of-phase A.C. voltage and the out-of-phase pulse train switches off. For a negative difference between the error signals, the resultant subtracts from the in-phase A.C. voltage and the in-phase pulse train switches off. The absence of either of the in-phase or inverted out-of-phase pulse trains results in the composite pulse train switching off.

When the composite pulse train disappears from the output of the composite pulse generator 59 and thus from the base of a transistor 63, the transistor 63 is allowed to remain "on," as a result of the D.C. currents summed into the base, and the collector voltage drops to a low level. This low voltage is insufficient to keep transistor 64 in a shorted state and current is allowed to flow through resistor 65 from the power supply and further saturate transistor 63. Even if the composite pulse train should reappear, it could not be amplified by transistor 63 until the transistor 64 is again returned to the shorted state. This can only be accomplished by recycling the D.C. excitation through resistor 66 and capacitor 67 which momentarily saturates the transistor 64 and allows the composite pulse train to pass through transistor 63.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:
1. In a system having a plurality of control channels,
 (1) at least a portion of said control channels being redundant,
 (2) each of said redundant portions including means for generating first signals representative of the actual performance of said redundant portion, (3) means for generating second signals simulating said first signals under normal conditions, (4) means including comparison means responsive to said first and second signals for providing a third signal when the difference between said first and second signals exceeds a predetermined value, and (5) means responsive to said third signal for rendering only the malfunctioning portion of said redundant portions ineffective.

2. In a system having a plurality of redundant control channels in which each control channel includes gyroscopic signal generating means, signal amplifying means and actuating means, (1) each of said gyroscopic signal generating means being connected through respective signal amplifying means for simultaneously controlling said actuating means, (2) gyroscopic monitoring means responsive to the performance of said gyroscopic signal generating means for providing a gyroscopic malfunction signal in the event said gyroscopic signal generating means malfunctions for rendering said gyroscopic signal generating means ineffective, (3) actuator monitoring means responsive to the performance of said actuator means for providing an actuator malfunction signal in the event said actuator means malfunctions for rendering said actuator means ineffective, and (4) means including gain changing means responsive to said malfunction signals and coupled to said amplifying means for changing the gain of said amplifying means to compensate for the ineffectiveness of said malfunctioning means.

3. In a system of the character described in claim 2 in which said monitoring means includes means for generating a signal representative of the simulated performance of said associated redundant portion and further includes means for comparing said simulated signal with a signal representative of the actual performance of said associated redundant portion for providing a comparison therebetween whereby said malfunction signal is provided when the difference between said actual and simulated signals exceeds a predetermined value.

4. In a system of the character described in claim 2 in which said means including gain changing means further includes logic circuit means responsive to said malfunction signals for rendering said gain changing means effective in the presence of a malfunction signal.

5. Fail safe signal comparison means comprising (1) first pulse train generating means for generating a first pulse train having a first phase, (2) second pulse train generating means for generating a second pulse train having a second phase opposite to said first phase, (3) first comparison signal generating means for providing a first comparison signal in-phase with said first phase, (4) second comparison signal generating means for providing a second comparison signal in-phase with said second phase, and (5) means including algebraic summation means responsive to said first and second pulse trains and to said first and second comparison signals for providing a first output signal when the difference between said first and second comparison signals is less than a predetermined value and a second output signal when the difference between said first and second comparison signals exceeds said predetermined value.

6. Fail safe signal comparison means of the character described in claim 5 in which said second output signal is provided by the absence of any output.

7. Fail safe signal comparison means of the character described in claim 5 further includes latching means responsive to said second output signal for continuing to render said first output signal ineffective although the difference between said first and second comparison signals subsequently drops below said predetermined value.

References Cited

UNITED STATES PATENTS

| | | | |
|---|---|---|---|
| 3,054,039 | 9/1962 | Meredith | 318—489 |
| 3,145,330 | 8/1964 | Hecht | 318—28 XR |
| 3,149,272 | 9/1964 | Dendy | 318—489 XR |
| 3,190,586 | 6/1965 | Righton | 244—77 |

BENJAMIN DOBECK, *Primary Examiner.*

U.S. Cl. X.R.

244—77; 318—489